United States Patent
Xiao

(10) Patent No.: US 11,681,020 B1
(45) Date of Patent: Jun. 20, 2023

(54) TECHNIQUES FOR PROGRAMMABLE BEAM STEERING COMPENSATION IN SCANNING LIDAR SYSTEMS

(71) Applicant: Aeva, Inc., Mountain View, CA (US)

(72) Inventor: Shijun Xiao, Foster City, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/859,956

(22) Filed: Jul. 7, 2022

(51) Int. Cl.
| | |
|---|---|
| *G01S 7/481* | (2006.01) |
| *G01S 17/931* | (2020.01) |
| *G01S 17/89* | (2020.01) |
| *G01S 7/4861* | (2020.01) |
| *G01S 17/42* | (2006.01) |
| *G02F 1/29* | (2006.01) |

(52) U.S. Cl.
CPC .......... *G01S 7/4817* (2013.01); *G01S 7/4811* (2013.01); *G01S 7/4816* (2013.01); *G01S 7/4861* (2013.01); *G01S 17/42* (2013.01); *G01S 17/89* (2013.01); *G01S 17/931* (2020.01); *G02F 1/292* (2013.01)

(58) Field of Classification Search
CPC . G02F 1/29; G02F 1/292; G02F 1/137; G01S 7/4817; G01S 7/4811; G01S 7/4816; G01S 7/4861; G01S 17/42; G01S 17/89; G01S 17/931

See application file for complete search history.

(56) References Cited

U.S. PATENT DOCUMENTS

| | | | | |
|---|---|---|---|---|
| 2006/0227317 | A1* | 10/2006 | Henderson | G01S 17/89 356/28 |
| 2018/0292726 | A1* | 10/2018 | Frantz | G02F 1/292 |
| 2020/0217966 | A1* | 7/2020 | Angus | G02F 1/292 |

* cited by examiner

*Primary Examiner* — Isam A Alsomiri
*Assistant Examiner* — Sanjida Naser
(74) *Attorney, Agent, or Firm* — Womble Bond Dickinson (US) LLP

(57) ABSTRACT

A system including an optical scanner to transmit an optical beam towards an object. The system includes a first optical element to receive a returned reflection having a lag angle; and steer the returned reflection to generate a first steered beam. The system includes a beam steering unit to receive the first steered beam, wherein the first steered beam is propagating at a first beam angle; and steer, the first steered beam based on an array voltage to generate a second steered beam at a first location on a photodetector. The system includes a processor to adjust the array voltage to cause the beam steering unit to steer the second steered beam from the first location on the photodetector to a second location on the photodetector to compensate for the lag angle.

16 Claims, 10 Drawing Sheets

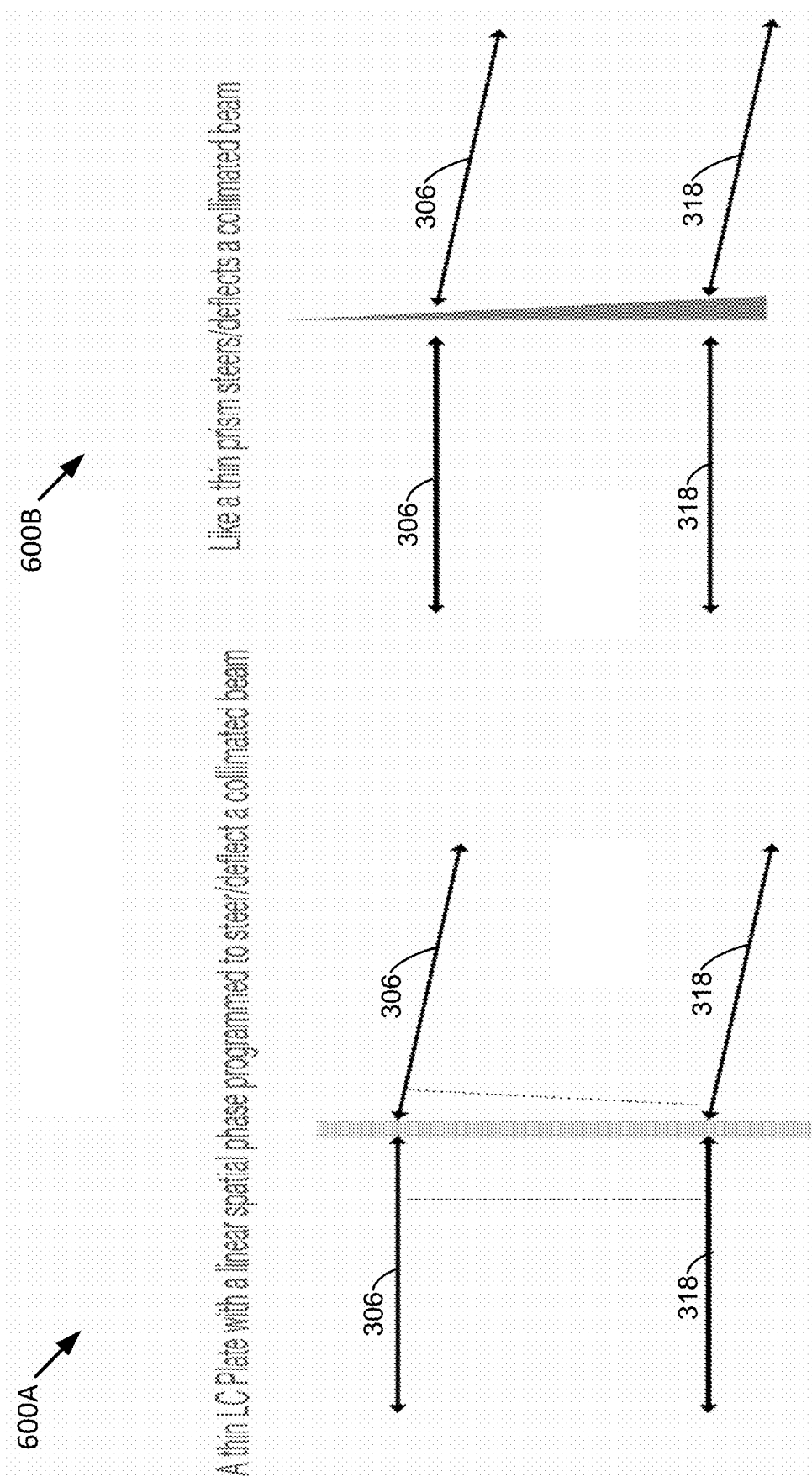

TECHNIQUES FOR PROGRAMMABLE BEAM STEERING COMPENSATION IN SCANNING LIDAR SYSTEMS

TECHNICAL FIELD

The present disclosure relates generally to optical detection, and more particularly to systems and methods for programmable beam steering compensation in a scanning light detection and ranging (LIDAR) system to enhance detection of distant objects.

BACKGROUND

A LIDAR system includes an optical scanner to transmit a frequency-modulated continuous wave (FMCW) infrared (IR) optical beam and to receive a return signal from reflections of the optical beam; an optical processing system coupled with the optical scanner to generate a baseband signal in the time domain from the return signal, where the baseband signal includes frequencies corresponding to LIDAR target ranges; and a signal processing system coupled with the optical processing system to measure energy of the baseband signal in the frequency domain, to compare the energy to an estimate of LIDAR system noise, and to determine a likelihood that a signal peak in the frequency domain indicates a detected target.

SUMMARY

One aspect disclosed herein is directed to a method including transmitting, by an optical scanner, an optical beam towards an object based on a transmit optical beam that propagates along an optical axis. The method includes receiving, by a first optical element responsive to the transmit of the optical beam, a returned reflection having a lag angle relative to the optical axis. The method includes steering, by the first optical element, the returned reflection to generate a first steered beam. The method includes receiving, by a beam steering unit, the first steered beam and a local oscillator (LO) signal associated with the transmit optical beam, wherein the first steered beam is propagating at a first beam angle relative to the optical axis and the LO signal is propagating at a first LO angle relative to the optical axis. The method includes steering, by the beam steering unit, the first steered beam based on an array voltage to generate a second steered beam at a first location on a photodetector. The method includes steering, by the beam steering unit, the LO signal based on the array voltage to generate a steered LO signal at a second location on the photodetector, wherein a beam offset between the first location and the second location is caused by the lag angle. The method includes adjusting, by a processor, the array voltage to cause the beam steering unit to reduce the beam offset between the first location and the second location.

In another aspect, the present disclosure is directed to a system including an optical scanner to transmit an optical beam towards an object based on a transmit optical beam that propagates along an optical axis. The system includes a first optical element to receive, responsive to the transmit of the optical beam, a returned reflection having a lag angle relative to the optical axis; and steer the returned reflection to generate a first steered beam. The system includes a beam steering unit to receive the first steered beam and a local oscillator (LO) signal associated with the transmit optical beam, wherein the first steered beam is propagating at a first beam angle relative to the optical axis and the LO signal is propagating at a first LO angle relative to the optical axis. The beam steering unit is further to steer the first steered beam based on an array voltage to generate a second steered beam at a first location on a photodetector. The beam steering unit is further to steer the LO signal based on the array voltage to generate a steered LO signal at a second location on the photodetector, wherein a beam offset between the first location and the second location is caused by the lag angle. The system includes a processor to adjust the array voltage to cause the beam steering unit to reduce the beam offset between the first location and the second location.

In another aspect, the present disclosure is directed to a system including an optical scanner to transmit an optical beam towards an object based on a transmit optical beam that propagates along an optical axis. The system includes a first optical element to receive, responsive to the transmit of the optical beam, a returned reflection having a lag angle relative to the optical axis; and steer the returned reflection to generate a first steered beam. The system includes a beam steering unit to receive the first steered beam, wherein the first steered beam is propagating at a first beam angle relative to the optical axis. The beam steering unit is further to steer, the first steered beam based on an array voltage to generate a second steered beam at a first location on a photodetector. The system includes a processor to adjust the array voltage to cause the beam steering unit to steer the second steered beam from the first location on the photodetector to a second location on the photodetector to compensate for the lag angle.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE FIGURE(S)

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

FIG. 6A is a block diagram illustrating an example beam steering unit, according to some embodiments;

FIG. 6B is a block diagram illustrating an example beam steering unit, according to some embodiments;

DETAILED DESCRIPTION

Figure 1:
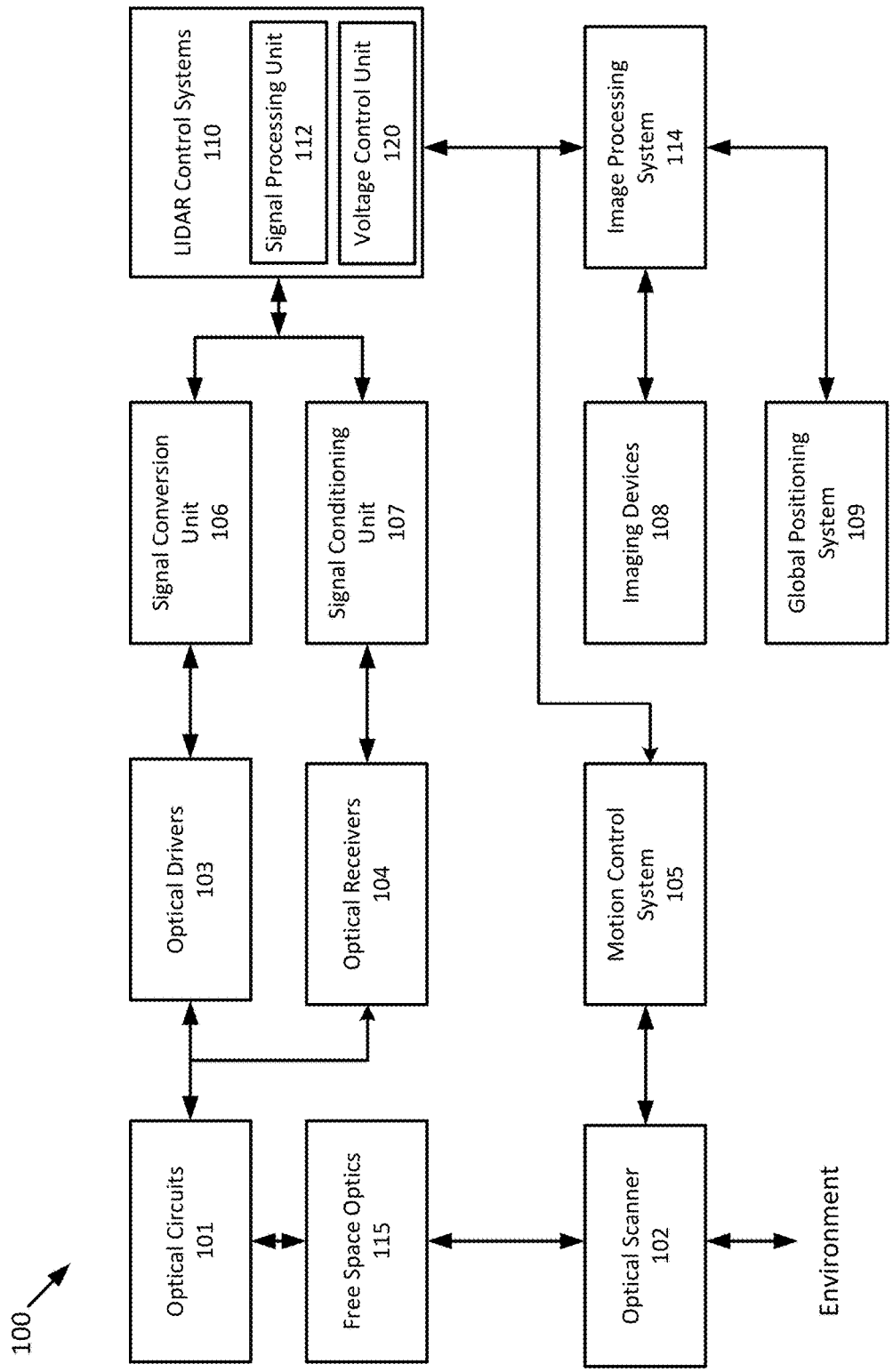
FIG. 1 is a block diagram illustrating an example of a LIDAR system, according to some embodiments.

According to some embodiments, the described LIDAR system using programmable beam steering compensation may be implemented in a variety of sensing and detection applications, such as, but not limited to, automotive, communications, consumer electronics, and healthcare markets. According to some embodiments, the described LIDAR system using programmable beam steering compensation may be implemented as part of a front-end of frequency modulated continuous-wave (FMCW) device that assists with spatial awareness for automated driver assist systems, or self-driving vehicles. According to some embodiments, the disclosed configuration may be agnostic to specific optical scanning architecture and can be tailored to enhance scanning LIDAR performance for a desired target range and/or to increase frame rate for a given range on the fly.

In a coherent LIDAR system, a frequency-modulated continuous wave (FMCW) transmitted light source (Tx) is used to determine the distance and velocity of objects in the scene by mixing a copy of the Tx source, known as the local oscillator (LO), with the received light (Rx) from the scene. The LO and Rx paths are combined on a fast photodiode (e.g., a photodetector), producing beat frequencies, proportional to object distance, which are processed electronically to reveal distance and velocity information of objects in the scene. To generate a point-cloud image, scanning optics are commonly used to deflect the Tx beam (e.g., signal) through the system field of view (FOV), comprising azimuth and zenith angles. In many applications, it is desirable to simultaneously achieve the highest possible scan rate and a large signal-to-noise ratio (SNR), as these two parameters directly affect the frame-rate of the LIDAR system, its maximum range (e.g., distance), range and velocity resolution, and the lateral spatial resolution.

However, increasing the scan rate produces a larger lag angle between the Rx light from a given object and the corresponding local oscillator (LO) that the LIDAR system uses to process the Rx light. This lag angle effect creates a beam walk-off problem, where the Tx light returned from distant objects are offset from the LO, which limits the achievable scan/frame rate and maximum range of the LIDAR system. Furthermore, the detection of objects at a large range produces large beat frequencies. Therefore, detecting distant objects with high fidelity requires the use of analog-to-digital convertors (ADCs) with very large sampling rates, approaching Giga-samples per second (Gsps), which consume a large amount of power.

Accordingly, the present disclosure addresses the above-noted and other deficiencies by disclosing systems and methods for using beam steering compensation in a frequency-modulated continuous wave (FMCW) LIDAR system to enhance detection of distant objects. As described in the below passages with respect to one or more embodiments, a LIDAR system includes an optical scanner to transmit an optical beam towards an object based on a transmit optical beam that propagates along an optical axis. The LIDAR system includes a first optical element to receive, responsive to the transmit of the optical beam, a returned reflection having a lag angle relative to the optical axis; and steer the returned reflection to generate a first steered beam. The LIDAR system includes a beam steering unit to receive the first steered beam and a local oscillator (LO) signal associated with the transmit optical beam, wherein the first steered beam is propagating at a first beam angle relative to the optical axis and the LO signal is propagating at a first LO angle relative to the optical axis. The beam steering unit is further to steer the first steered beam based on an array voltage to generate a second steered beam at a first location on a photodetector. The beam steering unit is further to steer the LO signal based on the array voltage to generate a steered LO signal at a second location on the photodetector, wherein a beam offset between the first location and the second location is caused by the lag angle. The LIDAR system includes a processor to adjust the array voltage to cause the beam steering unit to reduce the beam offset between the first location and the second location.

FIG. 1 is a block diagram illustrating an example of a LIDAR system, according to some embodiments. The LIDAR system 100 includes one or more of each of a number of components, but may include fewer or additional components than shown in FIG. 1. One or more of the components depicted in FIG. 1 can be implemented on a photonics chip, according to some embodiments. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like. In some embodiments, one or more LIDAR systems 100 may be mounted onto any area (e.g., front, back, side, top, bottom, and/or underneath) of a vehicle to facilitate the detection of an object in any free space relative to the vehicle. In some embodiments, the vehicle may include a steering system and a braking system, each of which may work in combination with one or more LIDAR systems 100 according to any information (e.g., distance/ranging information, Doppler information, etc.) acquired and/or available to the LIDAR system 100. In some embodiments, the vehicle may include a vehicle controller that includes the one or more components and/or processors of the LIDAR system 100.

Free space optics 115 may include one or more optical waveguides to carry optical signals, and route and manipulate optical signals to appropriate input/output ports of the active optical circuit. In embodiments, the one or more optical waveguides may include one or more graded index waveguides, as will be described in additional detail below at FIGS. 3-6. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control system 110 may include a processing device that may be implemented with a DSP, such as signal processing unit 112. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct, e.g., via signal processing unit 112, the optical drivers 103 to independently modulate one or more optical beams, and these modulated signals propagate through the optical circuits 101 to the free space optics 115. The free space optics 115 directs the light at the optical scanner 102 that scans a target environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from an environment pass through the optical circuits 101 to the optical receivers 104. Because the polarization of the light has been transformed, it may be reflected by a polarization beam splitter along with the portion of polarized light that was reflected back to the optical circuits 101. In such scenarios, rather than returning to the same fiber or waveguide serving as an optical source, the reflected signals can be reflected to separate optical receivers 104. These signals interfere with one another and generate a combined signal. The combined signal can then be reflected to the optical receivers 104. Also, each beam signal that returns from the target environment may produce a time-shifted waveform. The temporal phase difference between the two waveforms generates a beat frequency measured on the optical receivers 104 (e.g., photodetectors).

The analog signals from the optical receivers 104 are converted to digital signals by the signal conditioning unit 107. These digital signals are then sent to the LIDAR control systems 110. A signal processing unit 112 may then receive the digital signals to further process and interpret them. In some embodiments, the signal processing unit 112 also receives position data from the motion control system 105 and galvanometers (not shown) as well as image data from the image processing system 114. The signal processing unit 112 can then generate 3D point cloud data (sometimes referred to as, "a LIDAR point cloud") that includes information about range and/or velocity points in the target environment as the optical scanner 102 scans additional points. In some embodiments, a LIDAR point cloud may correspond to any other type of ranging sensor that is capable of Doppler measurements, such as Radio Detection and Ranging (RADAR). The signal processing unit 112 can also overlay 3D point cloud data with image data to determine velocity and/or distance of objects in the surrounding area. The signal processing unit 112 also processes the satellite-based navigation location data to provide data related to a specific global location.

Figure 2:
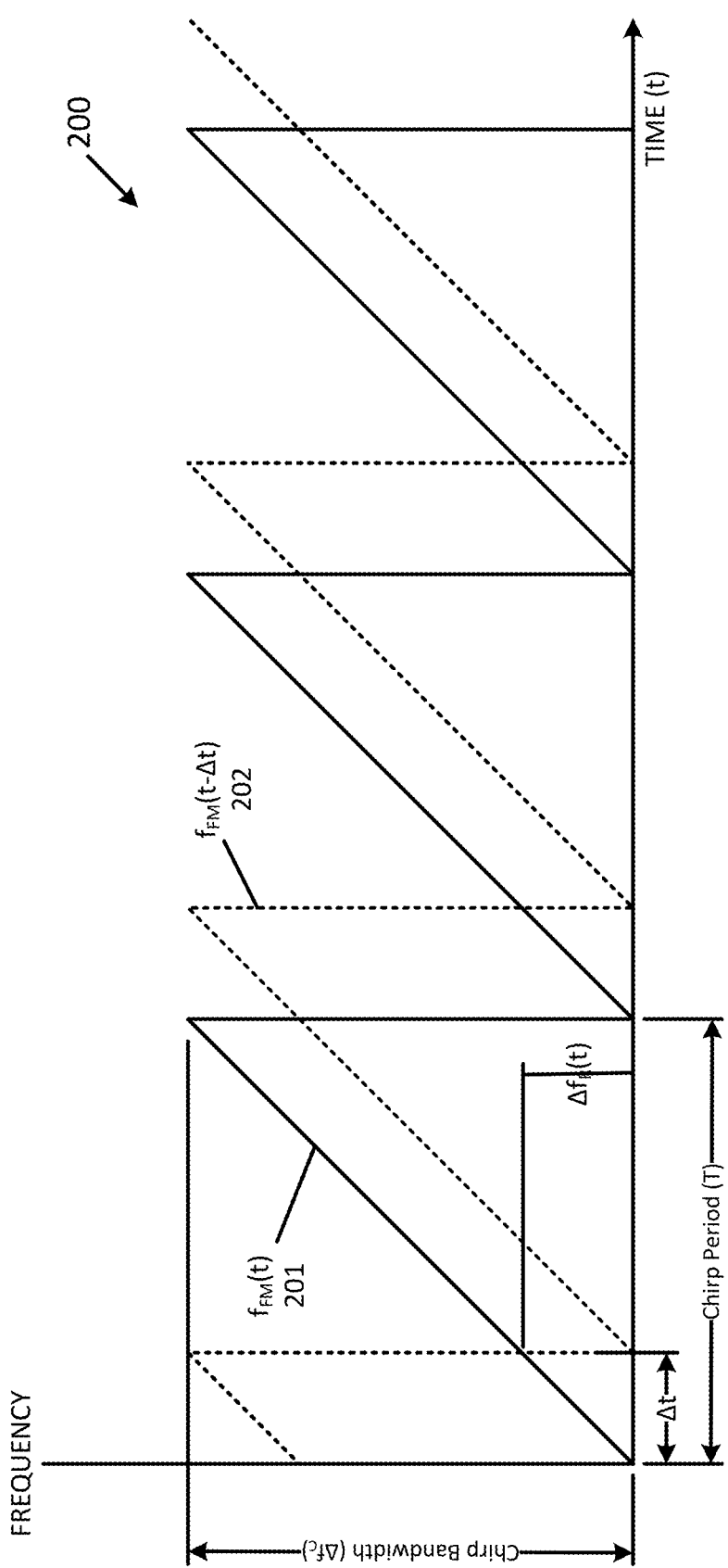
FIG. 2 is a time-frequency diagram illustrating an example of an FMCW scanning signal that can be used by a LIDAR system to scan a target environment, according to some embodiments.

FIG. 2 is a time-frequency diagram illustrating an example of an FMCW scanning signal that can be used by a LIDAR system to scan a target environment, according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning waveform 201, where $\Delta t$ is the round trip time to and from a target illuminated by scanning waveform 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range-dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct (e.g., adjust, modify) the frequency of the return signal, so the Doppler shift is not shown in FIG. 2 for simplicity and ease of explanation. For example, LIDAR system 100 may correct the frequency of the return signal by removing (e.g., subtracting, filtering) the Doppler shift from the frequency of the returned signal to generate a corrected return signal. The LIDAR system 100 may then use the corrected return signal to calculate a distance and/or range between the LIDAR system 100 and the object. In some embodiments, the Doppler frequency shift of target return signal 202 that is associated with an object may be indicative of a velocity and/or movement direction of the object relative to the LIDAR system 100.

It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
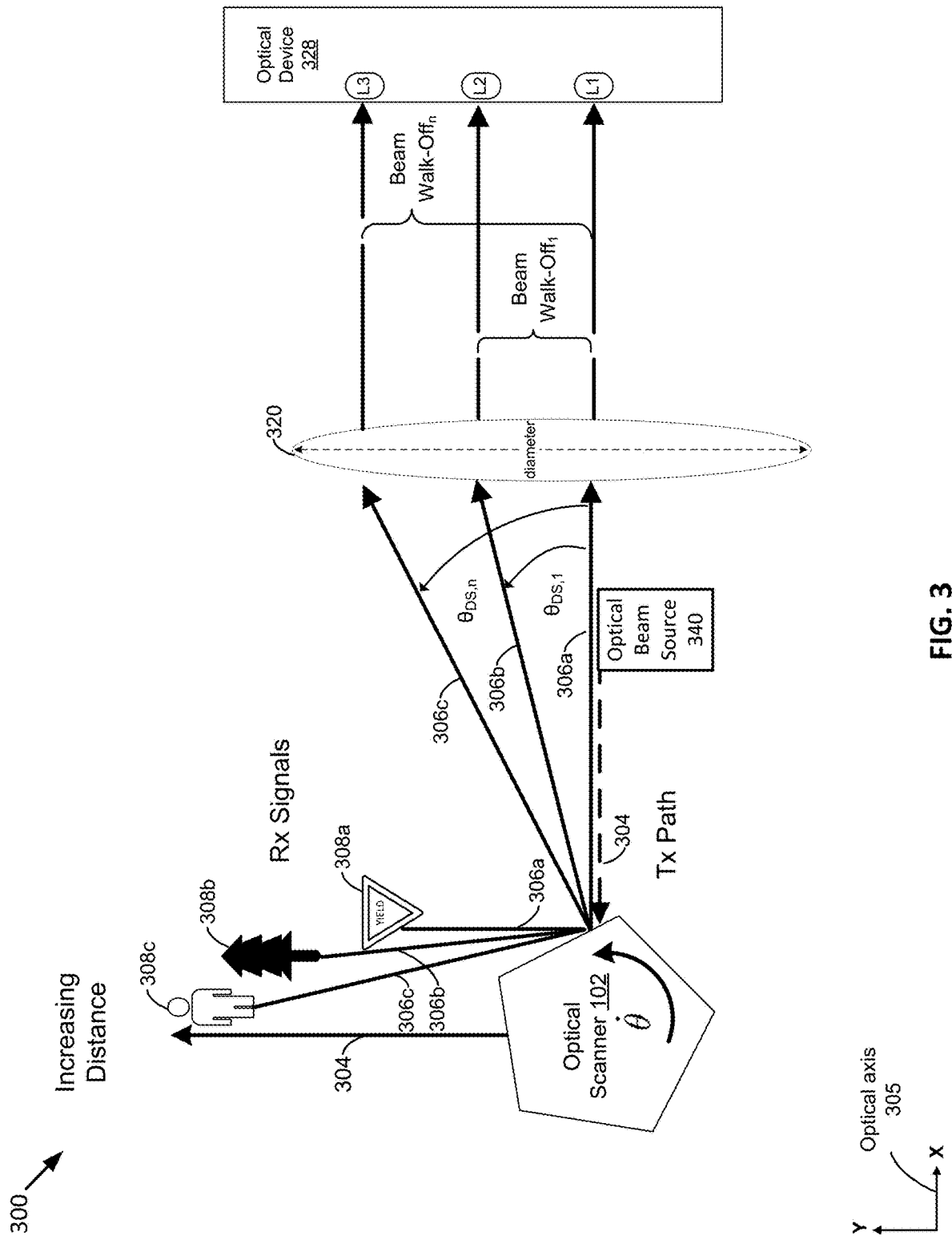
FIG. 3 is a block diagram illustrating an example environment for using an optical scanner to transmit optical beams towards distant objects and receive returned optical beams having different lag angles, according to some embodiments.

FIG. 3 is a block diagram illustrating an example environment for using an optical scanner to transmit optical beams towards distant objects and receive returned optical beams having different lag angles, according to some embodiments. The environment 300 includes the optical scanner 102 (e.g., a prism, a mirror), an optical beam source 340, a collimation lens 320 (sometimes referred to as, "optical element"), and an optical device 328 (sometimes referred to as, "optical element"). The optical device 328 may be a lens, a glass plate (sometimes referred to as, "local oscillator window"), or a beam steering unit. In some embodiments, the glass plate may be reflection coated glass plate or a partially reflective glass plate.

In some embodiments, any of the components (e.g., optical scanner 102, optical beam source 340, collimation lens 320, optical device 328, etc.) in the environment 300 may be added as a component of the LIDAR system 100 in FIG. 1, or be used to replace or modify any of the one or more components (e.g., free space optics 115, optical circuits, optical receivers 104, etc.) of the LIDAR system 100.

The environment 300 includes one or more objects, such as object 308a (e.g., a street sign), object 308b (e.g., a tree), and object 308c (e.g., a pedestrian); each collectively referred to as objects 308. Although FIG. 3 shows only a select number of objects 308, the environment 300 may include any number of objects 308 of any type (e.g., pedestrians, vehicles, street signs, raindrops, snow, street surface) that are within a short distance (e.g., 30 meters) or a long distance (e.g., 300 meters, 500 meters and beyond) from the optical scanner 102. In some embodiments, an object 308 may be stationary or moving with respect to the optical scanner 102.

In some embodiments, the optical scanner 102 is configured to receive one or more optical beams 304 (sometimes referred to as, "transmit optical beam") transmitted from the optical beam source 340 along an optical axis 305 (shown in FIG. 3 as the X-axis). In some embodiments, the optical scanner 102 is configured to steer (e.g., redirect, transmit, scatter) the one or more optical beams 304 into free space toward the one or more objects 308, which causes the one or more optical beams to scatter into returned optical beams 306a, 306b, 306c (collectively referred to as, "returned optical beams 306"). For example, the one or more optical beams 304 scatter against the object 308a to create a returned optical beam 306a, which is returned to the LIDAR system 100. As another example, the one or more optical beams 304 scatter against the object 308b to create a returned optical beam 306b, which is returned to the LIDAR system 100. As another example, the one or more optical beams 304 scatter against the object 308c to create a returned optical beam 306c, which is returned to the LIDAR system 100.

The collimation lens 320 is configured (e.g., positioned, arranged) to collect (e.g., receive, acquire, aggregate) the returned optical beams 306 that scatter from the one or more objects 308 in response to the optical scanner 102 steering the one or more optical beams 304 into free space. In some embodiments, the collimation lens 320 may be a symmetric lens having a diameter. In some embodiments, the collimation lens 320 may be an asymmetric lens.

As shown in FIG. 3, the lag angle between a respective returned optical beam 306 and the collimation lens 320 is indicated by $\theta_{DS,n}$, where n is an integer. For example, the lag angle between the returned optical beam 306a and the collimation lens 320 is indicated by $\theta_{DS,0}$ (not shown in FIG. 3), the lag angle between the returned optical beam 306b and the collimation lens 320 is indicated by $\theta_{DS,1}$, and the lag angle between the returned optical beam 306c and the collimation lens 320 is indicated by $\theta_{DS,2}$ (shown in FIG. 3 as, $\theta_{DS,n}$). In some embodiments, increasing the scan rate of the optical scanner 102 produces a larger lag angle between one or more of the returned optical beams 306.

As shown in FIG. 3, the optical device 328 receives the returned optical beam 306a at a location 1 (shown in FIG. 3 as, "L1") on the optical device 328 from the collimation lens 320 as a result of the returned optical beam 306a having a lag angle of zero degrees with respect to the optical axis 305, and the collimation lens 320 generating a collimated beam from the returned optical beams 306. The optical device 328 also receives the returned optical beam 306b at a location 2 (shown in FIG. 3 as, "L2") on the optical device 328 as a result of the returned optical beam 306b having a lag angle of $\theta_{DS,1}$ degrees with respect to the optical axis 305, and the collimation lens 320 generating a collimated beam from the returned optical beams 306. The optical device 328 also receives the returned optical beam 306c at a location 3 (shown in FIG. 3 as, "L3") on the optical device 328 as a result of the returned optical beam 306c having a lag angle of $\theta_{DS,2}$ degrees with respect to the optical axis 305, and the collimation lens 320 generating a collimated beam from the returned optical beams 306.

In other words, the respectively increasing lag angles of the returned optical beams 306a, 306b, 306c from the distant objects cause the optical device 328 to receive the returned optical beams 306 at different locations on the optical device 328. The offset of a location on the optical device 328 with respect to the optical axis 305 is referred to as a beam walk-off (e.g., a distance). For example, the difference in distance between location 2, where the optical device 328 receives the returned optical beam 306b, and location 1, where the optical device 328 receives the returned optical beam 306a, is referred to as beam walk-off$_1$. The difference in distance between location 3, where the optical device 328 receives the returned optical beam 306c, and location 2, where the optical device 328 receives the returned optical beam 306b, is referred to as beam walk-off$_2$ (shown in FIG. 3 as, "beam walk-off$_n$").

Although not shown in FIG. 3, the optical device 328 couples to the LIDAR control system 110 in FIG. 1 such to be able to pass any of the returned optical beams that are received by the optical device 328 to the LIDAR control system 110 for processing by the signal processing unit 112.

Figure 4:
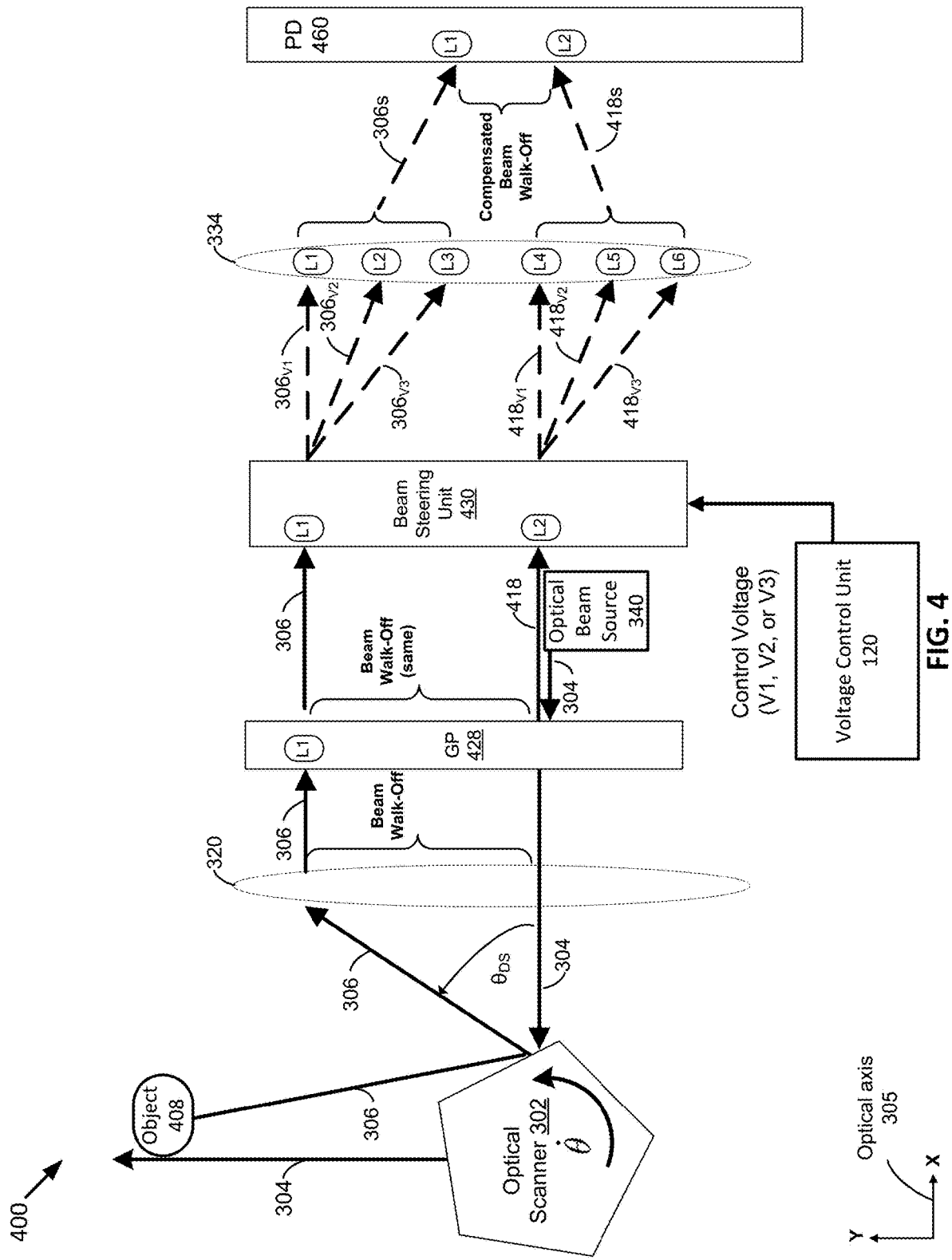
FIG. 4 is a block diagram illustrating an example environment for beam steering compensation in the LIDAR system 100 in FIG. 1 to enhance detection of distant objects, according to some embodiments.

FIG. 4 is a block diagram illustrating an example environment for beam steering compensation in the LIDAR system 100 in FIG. 1 to enhance detection of distant objects, according to some embodiments. The environment 400 includes the optical scanner 102, the collimation lens 320 (sometimes referred to as, "lens 3"), and the optical beam source 340. The environment 400 includes the optical device 328 from FIG. 3, but where the optical device 328 is a glass plate 428. In some embodiments, the glass plate 428 may be reflection coated glass plate or a partially reflective glass plate. The environment 400 includes a beam steering unit 430, a lens 334 (sometimes referred to as, "lens 4"), and a photodetector 460. The environment 400 includes a voltage control unit 120 that is communicatively coupled to the LIDAR control system 110. In some embodiments, as shown in FIG. 1, the voltage control unit 120 may be a component of the LIDAR control system 110.

In some embodiments, any of the components (e.g., beam steering unit 430, etc.) (e.g., optical scanner 102, optical beam source 340, collimation lens 320, glass plate 428, etc.) in the environment 400 may be added as a component of the LIDAR system 100 in FIG. 1, or be used to replace or modify any of the one or more components (e.g., free space optics 115, optical circuits, optical receivers 104, etc.) of the LIDAR system 100.

The environment 400 includes an object 408, such as object 308a in FIG. 3 (e.g., a street sign), object 308b in FIG. 3 (e.g., a tree), or object 308c in FIG. 3 (e.g., a pedestrian); each collectively referred to as objects 308. Although FIG. 4 shows only a single object 408, the environment 400 may include any number of objects 408 of any type that are within a short distance (e.g., 30 meters) or a long distance (e.g., 300 meters, 500 meters and beyond) from the optical scanner 102. In some embodiments, an object 408 may be stationary or moving with respect to the optical scanner 102.

An output terminal of the voltage control unit 120 is coupled to an input terminal of the beam steering unit 430. The LIDAR control system 110 may send instructions to the voltage control unit 120 to cause the voltage control unit 120 to generate a control voltage (e.g., 5V) and provide the voltage to the beam steering unit 430 via the output terminal of the control voltage control unit 120. In some embodiments, a plurality of output terminals of the voltage control unit 120 may be respectively coupled to a plurality of input terminals of the beam steering unit 430. As such, the LIDAR control system 110 may send instructions to the voltage control unit 120 to cause the voltage control unit 120 to generate an array voltage (sometimes referred to as, "control voltages") and provide the array voltage to the beam steering unit 430 via the plurality of output terminal of the voltage control unit 120. For example, the voltage control unit 120 may provide 4.5V to its first output terminal that is coupled to a first input terminal of the beam steering unit 430, the voltage control unit 120 may provide 4.8V to its second output terminal that is coupled to a second input terminal of the beam steering unit 430, the voltage control unit 120 may provide 0.0V to its third output terminal that is coupled to a third input terminal of the beam steering unit 430, and so on.

The optical scanner 102 is configured to receive an optical beam 304 transmitted from the optical beam source 340 along an optical axis 305 (shown in FIG. 4 as the X-axis), where the optical beam 304 passes through the glass plate 428. Furthermore, the glass plate 428 reflects a portion of the optical beam 304 to generate a local oscillator (LO) signal 418 that propagates along the optical axis and toward location 2 (shown in FIG. 4 as, "L2") on the beam steering unit 430.

The optical scanner 102 is configured to steer the optical beam 304 into free space toward the object 408, which causes the optical beam to scatter into returned optical beam 306 that is returned to the LIDAR system 100.

The collimation lens 320 is configured to collect the returned optical beam 306. The scan rate of the optical scanner 102 and/or the distance of the object 408 from the LIDAR system 100 causes the returned optical beam 306 to have a lag angle $\theta_{DS}$ with respect to the optical axis.

As shown in FIG. 4, the glass plate 428 receives the returned optical beam 306a at location 1 (shown in FIG. 3 as, "L1") on glass plate 428 as a result of the returned optical beam 306a having a lag angle $\theta_{DS}$ with respect to the optical axis 305, and the collimation lens 320 generating a collimated beam from the returned optical beam 306. The glass plate 428 steers the returned optical beam 306 to propagate along the optical axis and toward location 1 (shown in FIG. 4 as, "L1") on the beam steering unit 430.

Thus, the lag angle θDS of the returned optical beam 306a causes the beam steering unit 430 to receive the returned optical beam 306 and the local oscillator (LO) signal 418 at different locations (e.g., L1, L2) on the beam steering unit 430. This creates a beam walk-off (e.g., an error) that is equal to the distance between L2 and L1. This beam walk-off propagates to the LIDAR control system 110 and negatively affects the ability of the LIDAR control system 110 to accurately calculate metrics (e.g., distance, velocity, orientation, etc.) related to the object 408.

The beam steering unit 430, however, may be used to compensate (e.g., mitigate or substantially eliminate) for the beam walk-off, which in turn, improves the processing capability of the LIDAR control system 110. The beam steering unit 430 is an optical device that is transparent to the LIDAR laser wavelength (e.g., 905 nanometers (nm) and 1550 nm). The beam steering unit 430 may work in a transmissive or a reflective way to allow an optical beam (e.g., light) to pass thru it one or more times in reflection with a mirror. In one embodiment, the beam steering unit 430 may be a thin liquid crystal filled plate with patterned electrode to apply different voltage profiles on the liquid crystal layer to form a linear phase retardation along one direction. When the optical beam passes thru the beam steering unit 430, it experiences a linear spatial phase on its wavefront (e.g., the set of all points having the same phase change between adjacent points), which changes its beam direction depending on the linear phase direction in space. Depending on the angle change (lag angle) of the returned optical beams 306 that is due at least in part to the scanning optics, the beam steering unit 430 can be aligned with its linear phase direction in the angle shift direction of the returned optical beams 306. Thru its programmable capability, the beam steering unit 430 can be configured dynamically to optimize the mixing performance thru tuning the angle offset of the returned optical beams 306.

The LIDAR control system 110 may be configured to send instructions to the voltage control unit 120 to cause the voltage control unit 120 to generate one or more control voltages (e.g., a single voltage or a voltage array) and provide the one or more control voltages to the beam steering unit 430 via the output terminal of the voltage control unit 120. The one or more control voltages may, depending on the angle of the returned optical beam 306 at L1 on the beam steering unit 430, cause the beam steering unit 430 to change (e.g., adjust, modify) the angle of the returned optical beam 306.

For example, the returned optical beam 306 at L1 may have a first angle with respect to the optical axis 305. In response to receiving a control voltage $V_1$ from the voltage control unit 120, the beam steering unit 430 may generate a returned optical beam $306_{V1}$ that also has the same first angle. The beam steering unit 430 may provide the returned optical beam $306_{V1}$ to the lens 334 such that the returned optical beam $306_{V1}$ propagates along the optical axis at the first angle and toward location 1 (shown in FIG. 4 as, "L1") on the lens 334. Thus, the control voltage $V_1$ causes the beam steering unit 430 to allow the returned optical beam 306 to pass through the beam steering unit 430 without adjusting the first angle of the returned optical beam 306.

As another example, in response to receiving a control voltage $V_2$ from the voltage control unit 120, the beam steering unit 430 may generate a returned optical beam $306_{V2}$ that has a second angle, where the second angle is different from the first angle. The beam steering unit 430 may then provide the returned optical beam $306_{V2}$ to the lens 334 such that the returned optical beam $306_{V2}$ propagates along the optical axis at the second angle and toward location 2 (shown in FIG. 4 as, "L2") on the lens 334. Thus, the control voltage $V_2$ causes the beam steering unit 430 to adjust the first angle of the returned optical beam 306 to steer the returned optical beam 306.

As another example, in response to receiving a control voltage V3 from the voltage control unit 120, the beam steering unit 430 may generate a returned optical beam $306_{V2}$ that has the third angle, where the third angle is different from both the first angle and the second angle. The beam steering unit 430 may then provide the returned optical beam $306_{V3}$ to the lens 334 such that the returned optical beam $306_{V3}$ propagates along the optical axis 305 at the third angle and toward location 3 (shown in FIG. 4 as, "L3") on the lens 334. Thus, the control voltage $V_3$ causes the beam steering unit 430 to adjust the first angle of the returned optical beam 306 to steer the returned optical beam 306.

The one or more control voltages may also, depending on its angle at L2 on the beam steering unit 430, change the angle of the LO signal 418. For example, the LO signal 418 at L2 may have a first angle with respect to the optical axis 305. In response to receiving a control voltage $V_1$ from the voltage control unit 120, the beam steering unit 430 may generate a LO signal 418$_{r1}$ that also has the same first angle. The beam steering unit 430 may provide the LO signal 418$_{r1}$ to the lens 334 such that the LO signal 418$_{r1}$ propagates along the optical axis at the first angle and toward location 4 (shown in FIG. 4 as, "L4") on the lens 334. Thus, the control voltage V$_1$ causes the beam steering unit 430 to allow the LO signal 418 to pass through the beam steering unit 430 without adjusting the first angle of the LO signal 418.

As another example, in response to receiving a control voltage V2 from the voltage control unit 120, the beam steering unit 430 may generate a LO signal 418$_{r2}$ that has second angle, where the second angle is different from the first angle. The beam steering unit 430 may then provide the LO signal 418$_{r2}$ to the lens 334 such that the LO signal 418$_{r2}$ propagates along the optical axis 305 at the second angle and toward location 5 (shown in FIG. 4 as, "L5") on the lens 334. Thus, the control voltage V$_2$ causes the beam steering unit 430 to adjust the first angle of the LO signal 418 to steer the LO signal 418.

As another example, in response to receiving a control voltage V3 from the voltage control unit 120, the beam steering unit 430 may generate a LO signal 418$_{r2}$ that has the third angle, where the third angle is different from both the first angle and the second angle. The beam steering unit 430 may then provide the LO signal 418$_{r3}$ to the lens 334 such that the LO signal 418$_{r3}$ propagates along the optical axis 305 at the third angle and toward location 6 (shown in FIG. 4 as, "L6") on the lens 334. Thus, the control voltage V3 causes the beam steering unit 430 to adjust the first angle of the LO signal 418 to steer the LO signal 418.

The lens 334 is configured to receive one of the returned optical beams 306 (e.g., returned optical beam 306$_{r1}$, returned optical beam 306$_{r2}$, or returned optical beam 306$_{r3}$) at its corresponding angle (e.g., first angle, second angle, or third angle) and steer the returned optical beam 306 (shown in FIG. 4 as, "returned optical beam 306$_S$") to propagate along the optical axis toward location 1 (shown in FIG. 4 as, "L1") on the photodetector 460. In some embodiments, depending on the location in which the beam steering unit 430 receives the returned optical beam 306, the lens 334 may either (a) steer the returned optical beam 306 by adjusting (e.g., adding or subtracting degrees) the corresponding angle of the returned optical beam 306 to generate the returned optical beam 306$_S$, or (b) allow the returned optical beam 306 to pass through the lens 334 without adjusting the corresponding angle of the returned optical beam 306.

Similarly, the lens 334 is configured to receive one of the LO signal 418 (e.g., LO signal 418$_{r1}$, LO signal 418$_{r2}$, or LO signal 418$_{r3}$) at its corresponding angle (e.g., first angle, second angle, or third angle) and steer the LO signal 418 (shown in FIG. 4 as, "LO signal 418$_S$") to propagate along the optical axis 305 toward location 2 (shown in FIG. 4 as, "L2") on the photodetector 460. In some embodiments, depending on the location in which the beam steering unit 430 receives the LO signal 418, the lens 334 may either (a) steer the LO signal 418 by adjusting (e.g., adding or subtracting degrees) the corresponding angle of the LO signal 418 to generate the LO signal 418$_S$, or (b) allow the LO signal 418 to pass through the lens 334 without adjusting the corresponding angle of the LO signal 418.

Although, FIG. 4 shows that the beam steering unit 430 steers the returned optical beams 306 and the LO signal 418 in the same downward direction (e.g., decreasing beam angle) relative to the optical axis 305, the beam steering unit 430 may be configured to steer the returned optical beam 306 and the LO signal 418 in an upward direction. In some embodiments, the beam steering unit 430 may be configured to steer the returned optical beam 306 and the LO signal 418 in opposite directions. For example, the beam steering unit 430 may be configured to steer the returned optical beam 306 in an upward direction by adding degrees to the angle of the returned optical beam 306, and steer the LO signal 418 in a downward direction by subtracting degrees from the angle of the LO signal 418, or vice versa. In some embodiments, the beam steering unit 430 may be configured to adjust the angle of the returned optical beam 306 and the LO signal 418 by an equal amount (e.g., 10 degrees, −10 degrees, etc.).

The photodetector 460 receives the returned optical beam 306 (shown in FIG. 4 as, "returned optical beam 306$_S$") at L1 and the LO signal 418 (shown in FIG. 4 as, "LO signal 418*s*") at L2. The distance between L1 and L2 corresponds to a compensated beam walk-off because it is less than the beam walk-off at input (e.g., L1 and L2) of the beam steering unit 430, and which was caused by the lag angle θ$_{DS}$ of the returned optical beam 306. The photodetector 460 can now more accurately detect the returned optical beam 306 and the LO signal 418 at its inputs to generate electrical signals having beat frequencies that are indicative of the returned optical beam 306. The photodetector 460 then provides the electrical signals to the LIDAR control system for processing to calculate metrics (e.g., distance, velocity, orientation, etc.) related to the object 408.

Although not shown in FIG. 4, the output of the photodetector 460 couples to the LIDAR control system 110 in FIG. 1 such to be able to pass any of its outputs (e.g., electrical signals) to the LIDAR control system 110 for processing by the signal processing unit 112.

Figure 5:
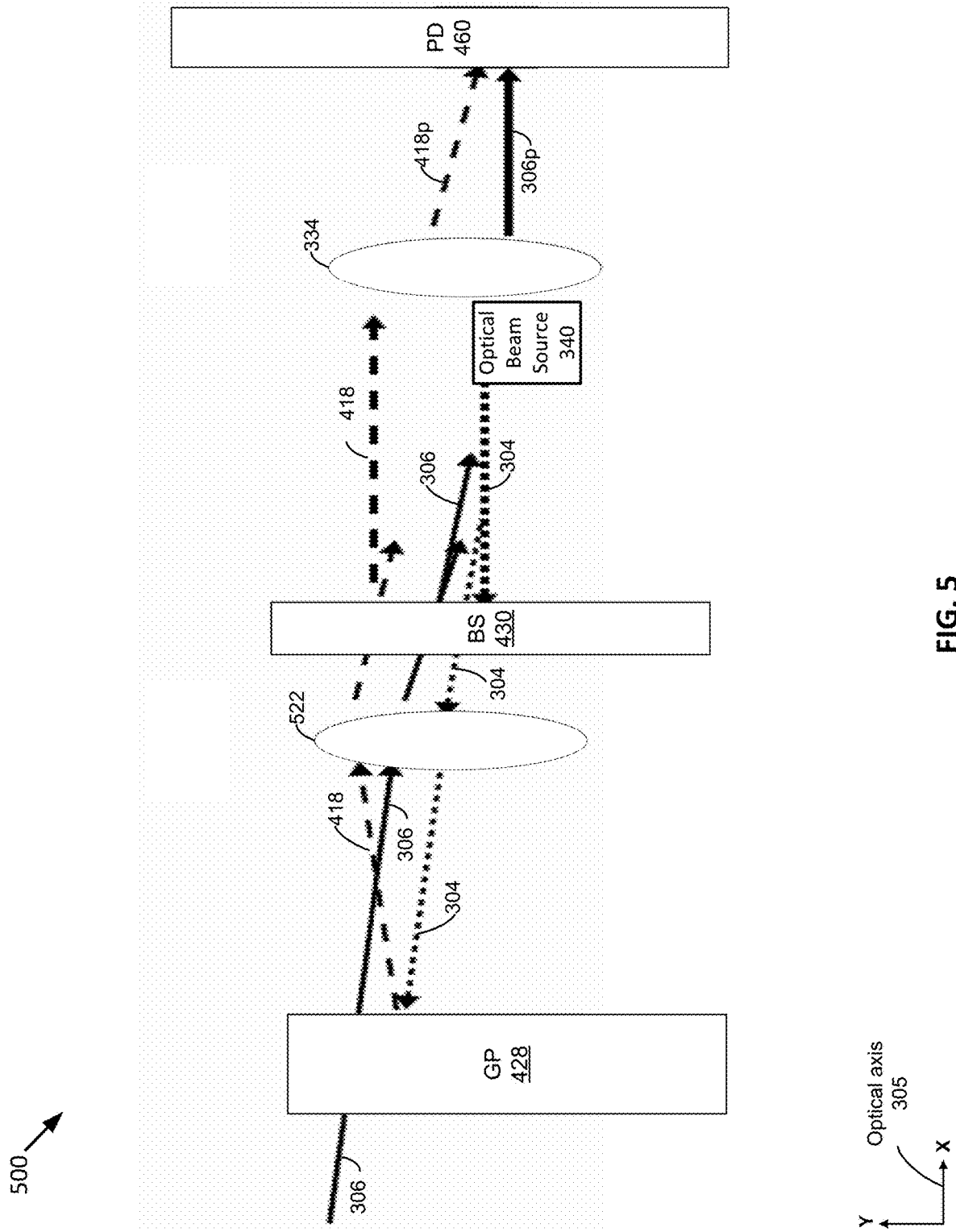
FIG. 5 is a block diagram illustrating an example environment for beam steering compensation in the LIDAR system 100 in FIG. 1 to enhance detection of distant objects using an additional lens, according to some embodiments.

FIG. 5 is a block diagram illustrating an example environment for beam steering compensation in the LIDAR system 100 in FIG. 1 to enhance detection of distant objects using an additional lens, according to some embodiments. The environment 500 includes the same arrangement of the components depicted in FIG. 4, expect that the optical beam source 340 is positioned between the beam steering unit 430 and the lens 324, instead of being positioned between the glass plate 428 and the beam steering unit 430, as shown in FIG. 4. In this alternate configuration, the optical beam source 340 is configured to transmit an optical beam 304 along the optical axis 305 toward the beam steering unit 430. The beam steering unit 430 is configured to adjust, based the control voltage, an angle of the optical axis 305 to steer the optical axis 305.

The environment 500 also includes a lens 522 (sometimes referred to as, "L2") positioned between the glass plate 428 and the beam steering unit 430 to receive one or more optical beams (e.g., optical beam 304, LO signal 418, returned optical beam 306). Depending on the location in which the beam steering unit 430 receives an optical beam, the lens 522 may either (a) steer the optical beam by adjusting is angle, or (b) allow the optical beam to pass through the lens 522 without adjusting its angle.

FIG. 6A is a block diagram illustrating an example beam steering unit 430, according to some embodiments. In this embodiment, the beam steering unit 430 is a thin liquid crystal (LC) plate with a linear spatial phase that is configured (e.g., programmed) to steer or deflect a collimated beam.

FIG. 6B is a block diagram illustrating an example beam steering unit 430, according to some embodiments. In this embodiment, the beam steering unit 430 is a thin prism that is configured to steer or deflect a collimated beam.

Figures 7A, 7B:
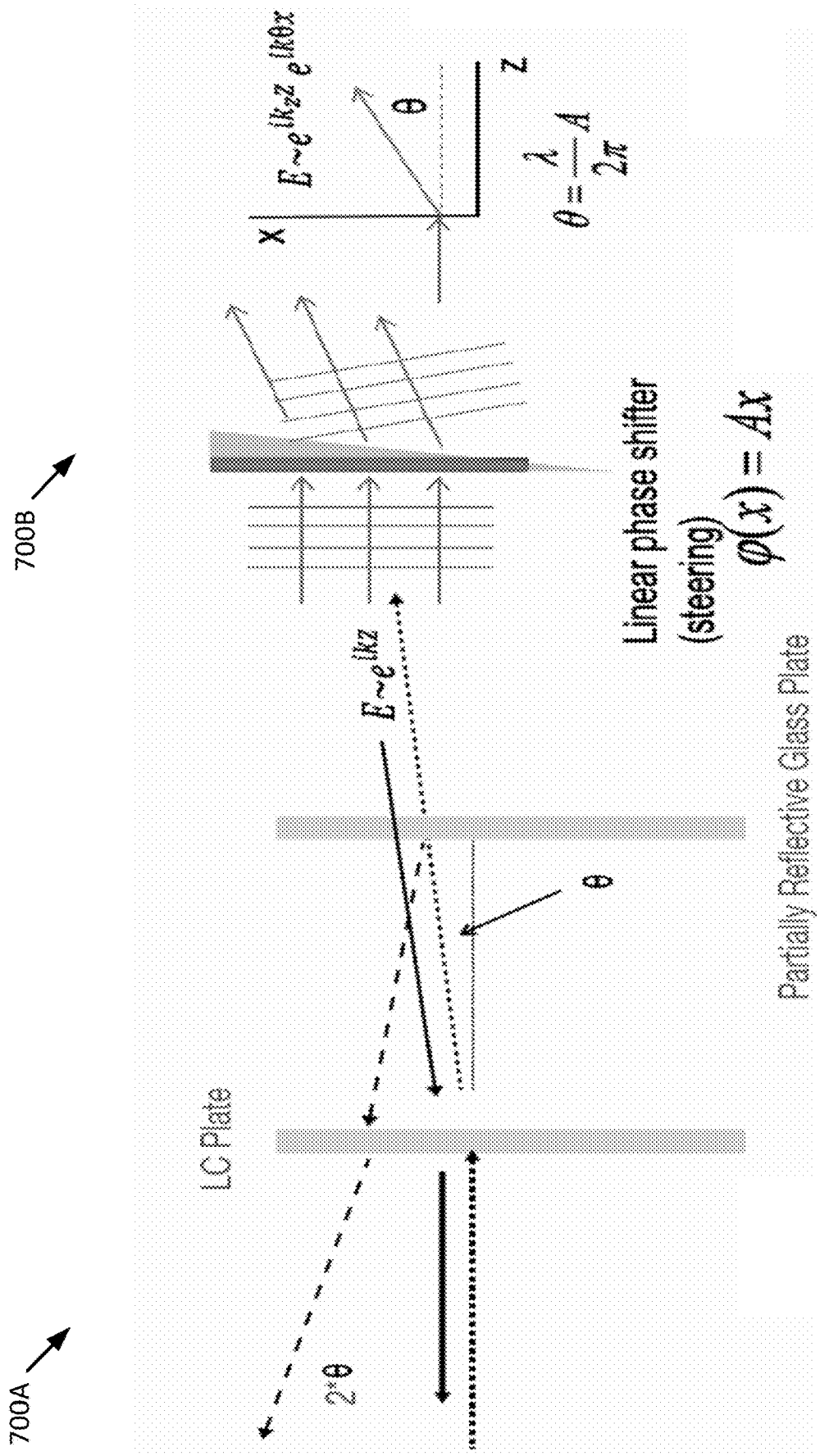
FIGS. 7A-7B are block diagrams illustrating an example equation that models the performance of the beam steering unit 430 in FIG. 4, according to some embodiments.
Figure 8:
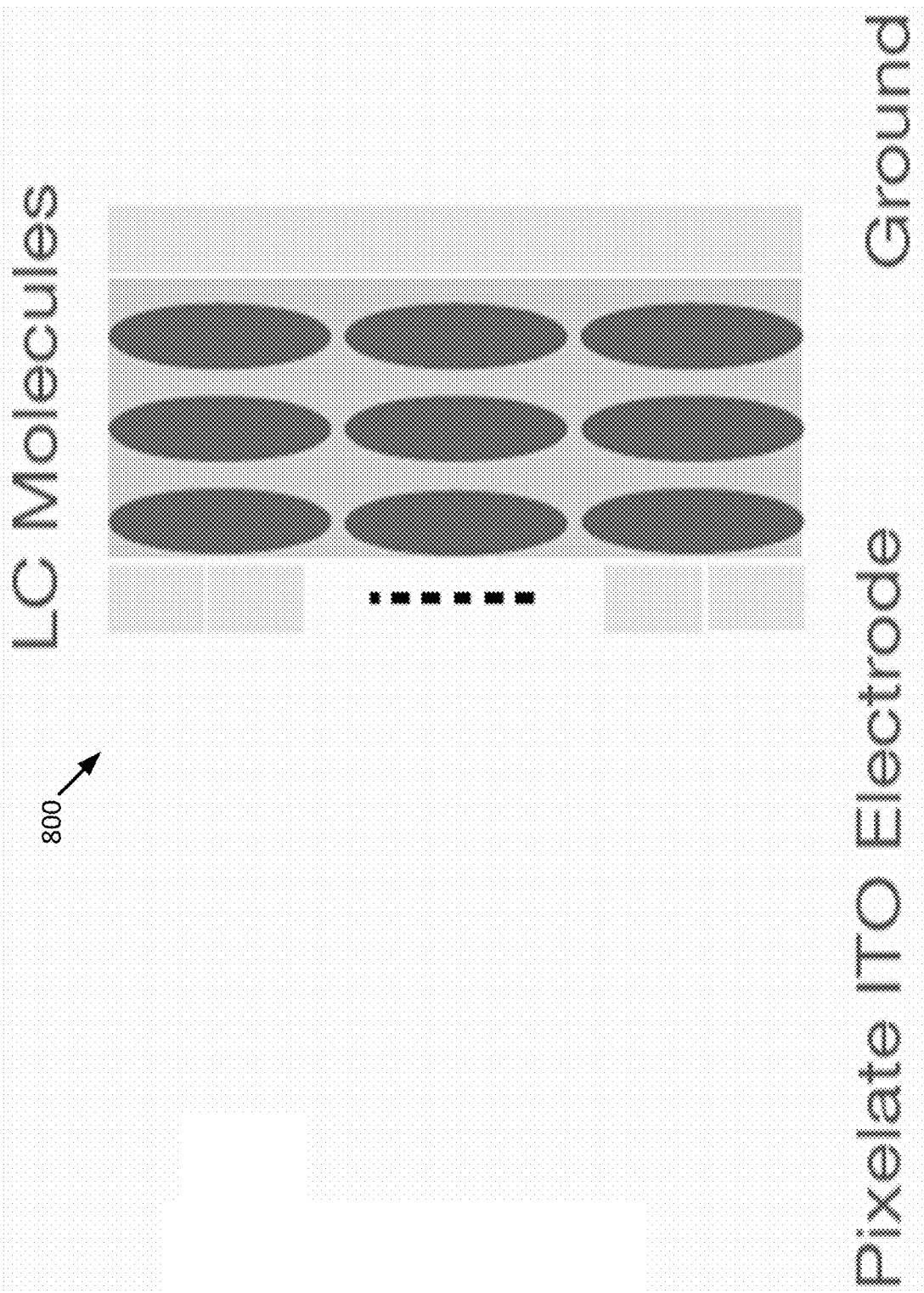
FIG. 8 is a block diagram illustrating an example structure of a beam steering unit, according to some embodiments.

FIGS. 7A-7B are block diagrams illustrating an example equation that models the performance of the beam steering unit 430 in FIG. 3, according to some embodiments. That is, the beam steering unit 430 may be configured as a linear phase shifter to steer the optical beams that pass through the beam steering unit 430. The beam steering unit 430 may set the angle θ of the optical beam by shifting the phase of an optical beam according to the following equations:

$$\theta = \frac{\lambda}{2\pi} A; \quad (1)$$

where λ= is the optical beam's wavelength; A= is the slope of the linear spatial phase $$E \sim e^{ik_z z} e^{ik\theta x} \quad (2)$$

where E= is the optical field; i= is the notation of the imaginary part of a complex value; k= is the optical wave vector; z= is the coordinate along the optical beam propagation direction FIG. 8 is a block diagram illustrating an example structure of a beam steering unit, according to some embodiments. The beam steering unit 800 (e.g., beam steering unit 430 in FIG. 4) includes a thin layer of LC that is sandwiched between two indium tin oxide (ITO) conductive layers. The first layer is coupled to a ground supply and the second layer is pixellated. In some embodiments, the LC layer thickness is on the order of ten to tens of micrometers. In some embodiments, the ITO is optically transparent. In some embodiments, the whole structure is between two glass substrates that are of several tenth millimeter thick. By applying different voltages on the ITO pixels, it can form a linear phase delay or retardation across the pixels.

Figure 9:
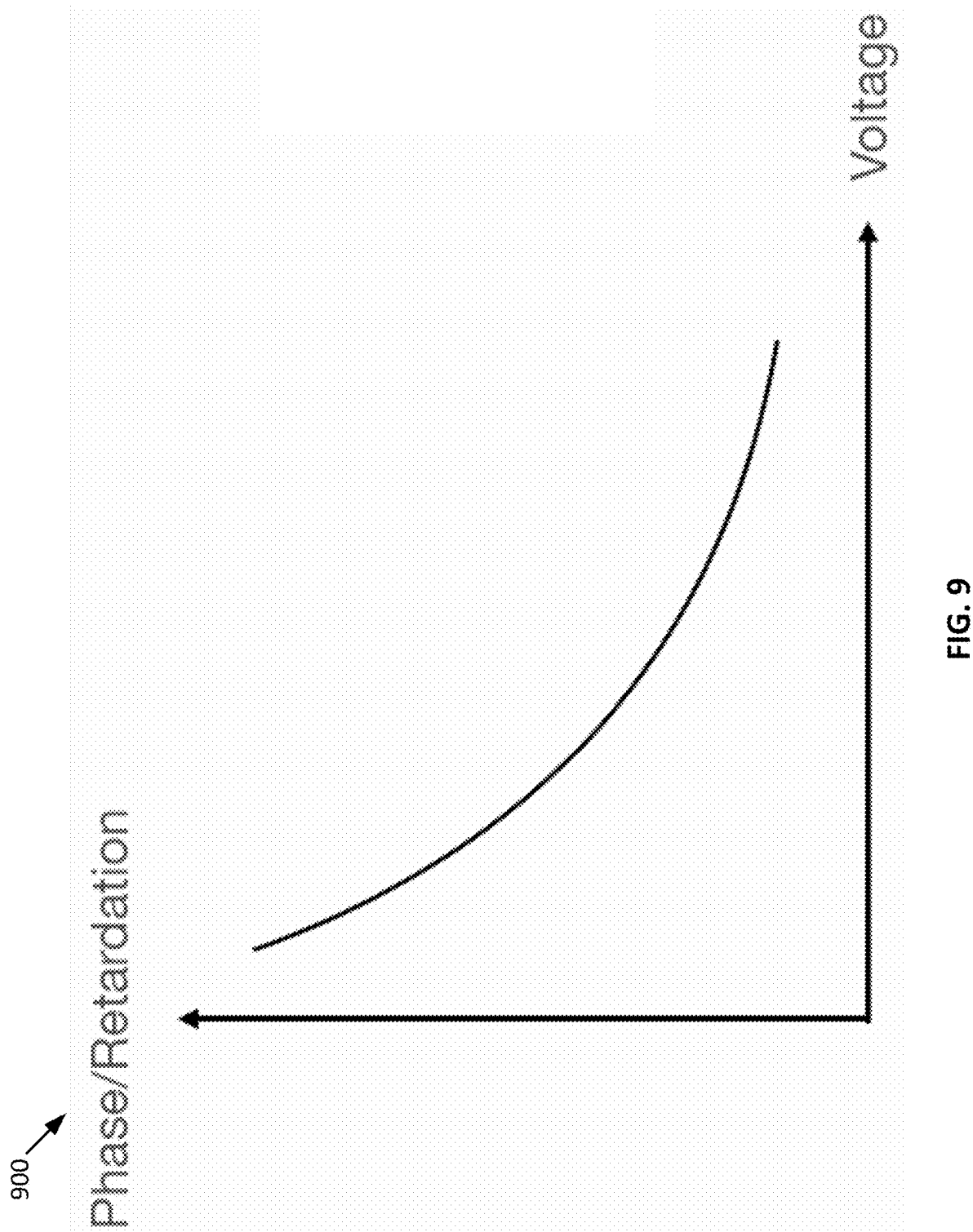
FIG. 9 is a graph illustrating the relationship between control voltage and birefringence phase delay or retardation of a beam steering unit, according to some embodiments.

FIG. 9 is a graph illustrating the relationship between control voltage and birefringence phase delay or retardation of a beam steering unit, according to some embodiments. In this embodiment, the beam steering unit includes a thin LC of several micrometers. The graph 900 shows that the higher the voltage is, then the less the optical birefringence phase delay. To form a linear spatial phase retardation profile across all pixels, the phase retardation at each pixel is calculated with the linear phase function, and the required voltage for each pixel is calculated with the retardation vs. voltage curve.

Figure 10:
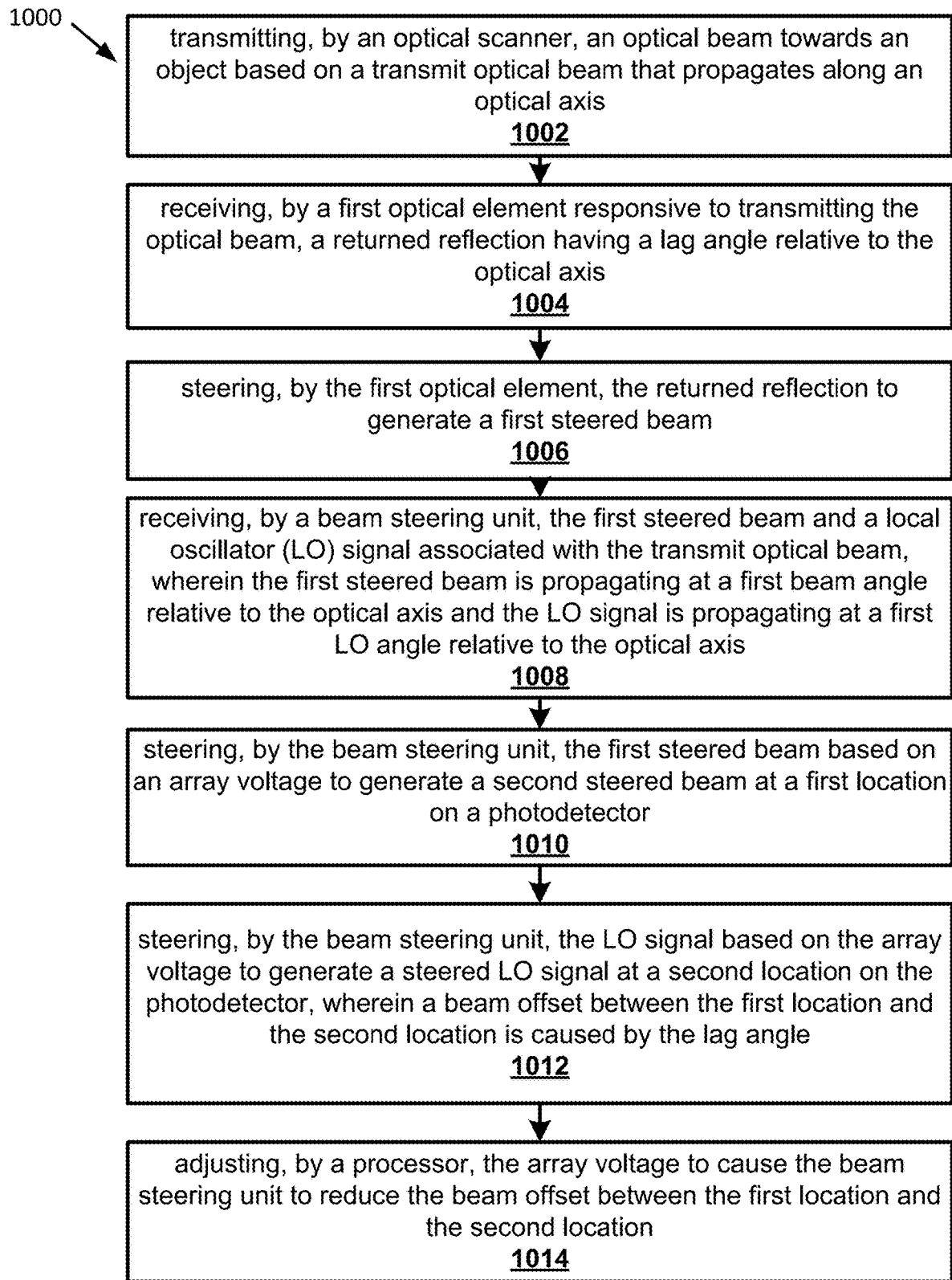
FIG. 10 is a flow diagram illustrating an example method for beam steering compensation in an FMCW LIDAR system to enhance detection of distant objects, according to some embodiments.

FIG. 10 is a flow diagram illustrating an example method for beam steering compensation in an FMCW LIDAR system to enhance detection of distant objects, according to some embodiments. Additional, fewer, or different operations may be performed in the method depending on the particular arrangement. In some embodiments, some or all operations of method 1000 may be performed by one or more processors executing on one or more computing devices, systems, or servers (e.g., remote/networked servers or local servers). In some embodiments, method 1000 may be performed by a signal processing unit, such as signal processing unit 112 in FIG. 1. In some embodiments, method 1000 may be performed by any of the components (e.g., scanner 302, GP 428, beam steering unit 430, voltage control unit 120, etc.) in environment 400 in FIG. 4, and/or the components in environment 500 in FIG. 5. Each operation may be re-ordered, added, removed, or repeated.

In some embodiments, the method 1000 may include the operation 1002 of transmitting, by an optical scanner, an optical beam towards an object based on a transmit optical beam that propagates along an optical axis. In some embodiments, the method 1000 may include the operation 1004 of receiving, by a first optical element responsive to transmitting the optical beam, a returned reflection having a lag angle relative to the optical axis. In some embodiments, the method 1000 may include the operation 1006 of steering, by the first optical element, the returned reflection to generate a first steered beam.

In some embodiments, the method 1000 may include the operation 1008 of receiving, by a beam steering unit, the first steered beam and a local oscillator (LO) signal associated with the transmit optical beam, wherein the first steered beam is propagating at a first beam angle relative to the optical axis and the LO signal is propagating at a first LO angle relative to the optical axis. In some embodiments, the method 1000 may include the operation 1010 of steering, by the beam steering unit, the first steered beam based on an array voltage to generate a second steered beam at a first location on a photodetector.

In some embodiments, the method 1000 may include the operation 1012 of steering, by the beam steering unit, the LO signal based on the array voltage to generate a steered LO signal at a second location on the photodetector, wherein a beam offset between the first location and the second location is caused by the lag angle. In some embodiments, the method 1000 may include the operation 1014 of adjusting, by a processor, the array voltage to cause the beam steering unit to reduce the beam offset between the first location and the second location.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Moreover, the separation of various system components in the embodiments described above should not be understood as requiring such separation in all embodiments, and it should be understood that the described program components and systems can generally be integrated together in a single software product or packaged into multiple software products. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   transmitting, by an optical scanner, an optical beam towards an object based on a transmit optical beam that propagates along an optical axis;
   receiving, by a first optical element responsive to transmitting the optical beam, a returned reflection having a lag angle relative to the optical axis;
   steering, by the first optical element, the returned reflection to generate a first steered beam;
   receiving, by a beam steering unit, the first steered beam and a local oscillator (LO) signal associated with the transmit optical beam, wherein the first steered beam is propagating at a first beam angle relative to the optical axis and the LO signal is propagating at a first LO angle relative to the optical axis;
   steering, by the beam steering unit, the first steered beam based on an array voltage to generate a second steered beam at a first location on a photodetector;
   steering, by the beam steering unit, the LO signal based on the array voltage to generate a steered LO signal at a second location on the photodetector, wherein a beam offset between the first location and the second location is caused by the lag angle; and
   adjusting, by a processor, the array voltage to cause the beam steering unit to reduce the beam offset between the first location and the second location,
   wherein the second steered beam propagates at a second beam angle relative to the optical axis, the steered LO signal propagates at a second LO angle relative to the optical axis, at least one of the second beam angle is different from the first beam angle or the second LO angle is different from the first LO angle, and the second beam angle of the second steered beam is different from the second LO angle of the steered LO signal.

2. The method of claim 1, wherein,
   the second beam angle of the second steered beam is generated further based on the first beam angle of the first steered beam; and
   the second LO angle of the steered LO signal is generated further based on the first LO angle of the LO signal.

3. The method of claim 1, further comprising: adjusting the first beam angle of the first steered beam and the first LO angle of the LO signal by an equal amount that corresponds to the array voltage.

4. The method of claim 1, further comprising:
   steering, by a reflective glass plate, the first steered beam to adjust an angle of the first steer beam relative to the optical axis prior to receiving, by the beam steering unit, the first steered beam.

5. The method of claim 4, further comprising:
   receiving, by a second optical element, the first steered beam responsive to steering, by the reflective glass plate, the first steered beam to adjust the angle of the first steer beam relative to the optical axis;
   steering, by a second optical element, the first steered beam to further adjust the angle of the first steer beam relative to the optical axis; and
   providing, by the second optical element, the first steered beam to the beam steering unit.

6. The method of claim 1, wherein optical beam is a frequency-modulated continuous wave (FMCW) optical beam.

7. The method of claim 1, wherein the beam steering unit comprises a liquid crystal-filled plate having a patterned electrode, and wherein adjusting, by the processor, the array voltage to cause the beam steering unit to reduce the beam offset between the first location and the second location comprises:
   applying the array voltage to the patterned electrode to cause a linear phase retardation to form along one direction.

8. The method of claim 7, wherein the linear phase retardation causes a linear spatial phase on a wavefront of the first steered beam when the first steered beam passes through the beam steering unit.

9. A frequency modulated continuous wave (FMCW) light detection and ranging (LIDAR) system comprising:
   an optical scanner to:
   transmit an optical beam towards an object based on a transmit optical beam that propagates along an optical axis;

a first optical element to:
  receive, responsive to the transmit of the optical beam, a returned reflection having a lag angle relative to the optical axis;
  steer the returned reflection to generate a first steered beam;
a beam steering unit to:
  receive the first steered beam and a local oscillator (LO) signal associated with the transmit optical beam, wherein the first steered beam is propagating at a first beam angle relative to the optical axis and the LO signal is propagating at a first LO angle relative to the optical axis;
  steer the first steered beam based on an array voltage to generate a second steered beam at a first location on a photodetector; and
  steer the LO signal based on the array voltage to generate a steered LO signal at a second location on the photodetector, wherein a beam offset between the first location and the second location is caused by the lag angle; and
a processor to:
  adjust the array voltage to cause the beam steering unit to reduce the beam offset between the first location and the second location,
  wherein the second steered beam propagates at a second beam angle relative to the optical axis, the steered LO signal propagates at a second LO angle relative to the optical axis, at least one of the second beam angle is different from the first beam angle or the second LO angle is different from the first LO angle, and the second beam angle of the second steered beam is different from the second LO angle of the steered LO signal.

10. The FMCW LIDAR system of claim 9, wherein, the second beam angle of the second steered beam is generated further based on the first beam angle of the first steered beam; and
the second LO angle of the steered LO signal is generated further based on the first LO angle of the LO signal.

11. The FMCW LIDAR system of claim 9, wherein the beam steering unit to: adjust the first beam angle of the first steered beam and the first LO angle of the LO signal by an equal amount that corresponds to the array voltage.

12. The FMCW LIDAR system of claim 9, further comprising:
a reflective glass plate to steer the first steered beam to adjust an angle of the first steer beam relative to the optical axis prior to receive, by the beam steering unit, the first steered beam.

13. The FMCW LIDAR system of claim 12, further comprising:
a second optical element to:
  receive the first steered beam responsive to steer the first steered beam to adjust the angle of the first steer beam relative to the optical axis;
  steer the first steered beam to further adjust the angle of the first steer beam relative to the optical axis; and
  provide the first steered beam to the beam steering unit.

14. The FMCW LIDAR system of claim 9, wherein optical beam is a frequency-modulated continuous wave (FMCW) optical beam.

15. The FMCW LIDAR system of claim 9, wherein the beam steering unit comprises a liquid crystal-filled plate having a patterned electrode, wherein the linear phase retardation causes a linear spatial phase on a wavefront of the first steered beam when the first steered beam passes through the beam steering unit, and wherein the processor further to:
  apply the array voltage to the patterned electrode to cause a linear phase retardation to form along one direction.

16. A FMCW LIDAR system comprising:
an optical scanner to:
  transmit an optical beam towards an object based on a transmit optical beam that propagates along an optical axis;
a first optical element to:
  receive, responsive to the transmit of the optical beam, a returned reflection having a lag angle relative to the optical axis;
  steer the returned reflection to generate a first steered beam;
a beam steering unit to:
  receive the first steered beam, wherein the first steered beam is propagating at a first beam angle relative to the optical axis;
  steer, the first steered beam based on an array voltage to generate a second steered beam at a first location on a photodetector; and
a processor to:
  adjust the array voltage to cause the beam steering unit to steer the second steered beam from the first location on the photodetector to a second location on the photodetector to compensate for the lag angle,
  wherein the second steered beam propagates at a second beam angle relative to the optical axis, the steered LO signal propagates at a second LO angle relative to the optical axis, at least one of the second beam angle is different from the first beam angle or the second LO angle is different from the first LO angle, and the second beam angle of the second steered beam is different from the second LO angle of the steered LO signal.

* * * * *